United States Patent
Arnaud et al.

(10) Patent No.: US 9,964,657 B2
(45) Date of Patent: May 8, 2018

(54) TERMINAL FOR DETECTING AN OPTICALLY INVISIBLE NETWORK, INSTALLATION COMPRISING SUCH A DETECTION TERMINAL, AND METHOD FOR DETECTING AN OPTICALLY INVISIBLE NETWORK

(71) Applicant: SOCIETE PLYMOUTH FRANCAISE, Feyzin (FR)

(72) Inventors: Daniel Arnaud, Saint Etienne (FR); Mounir Saad, Strasbourg (FR)

(73) Assignee: SOCIETE PLYMOUTH FRANCAISE, Feyzin (FR)

( * ) Notice: Subject to any disclaimer, the term of this patent is extended or adjusted under 35 U.S.C. 154(b) by 206 days.

(21) Appl. No.: 14/436,977

(22) PCT Filed: Oct. 17, 2013

(86) PCT No.: PCT/FR2013/052484
§ 371 (c)(1),
(2) Date: Apr. 20, 2015

(87) PCT Pub. No.: WO2014/060704
PCT Pub. Date: Apr. 24, 2014

(65) Prior Publication Data
US 2015/0276961 A1   Oct. 1, 2015

(30) Foreign Application Priority Data
Oct. 19, 2012   (FR) ...................................... 12 59980

(51) Int. Cl.
*G01V 3/15*   (2006.01)
*G01V 3/02*   (2006.01)
(Continued)

(52) U.S. Cl.
CPC ............... *G01V 3/02* (2013.01); *G01V 3/08* (2013.01); *G01V 15/00* (2013.01); *H01R 4/643* (2013.01);
(Continued)

(58) Field of Classification Search
CPC . G01V 3/02; G01V 3/08; G01V 15/00; H01R 4/643; H01R 9/2475; H01R 2101/00
(Continued)

(56) References Cited

U.S. PATENT DOCUMENTS 5,864,093 A  * 1/1999 Hecock .................... H01R 4/66
                                                                 174/78
2010/0077954 A1 * 4/2010 Eigel ........................ F16L 1/11
                                                                 116/209

FOREIGN PATENT DOCUMENTS

BE    881807 A1    6/1980
DE    2735344 A1   2/1979
(Continued)

OTHER PUBLICATIONS

Espacenet translation of Bertrand FR2691230 A1 Nov. 19, 1993.*
(Continued)

*Primary Examiner* — Melissa Koval
*Assistant Examiner* — Courtney McDonnough
(74) *Attorney, Agent, or Firm* — Cantor Colburn LLP

(57) ABSTRACT

This detection terminal (2) includes a fixing portion (4) intended to be fixed in a structure, an electrically conductive protective portion (5) secured to the fixing portion (4) and arranged to protect the fixing portion (4), the protective portion (5) being arranged to be accessible from the outside of the structure so as to allow the injection of an electric signal, and connection means intended to connect propagation means capable of propagating an electric signal along the optically invisible network, the connection means being (Continued)

connected to the protective portion (5) so as to hold, when in use, an electrical continuity between the protective portion (5) and the propagation means.

14 Claims, 7 Drawing Sheets

(51) Int. Cl.
*G01V 15/00* (2006.01)
*H01R 4/64* (2006.01)
*G01V 3/08* (2006.01)
*H01R 9/24* (2006.01)
*H01R 101/00* (2006.01)

(52) U.S. Cl.
CPC ........ *H01R 9/2475* (2013.01); *H01R 2101/00* (2013.01)

(58) Field of Classification Search
USPC .......................................................... 324/326
See application file for complete search history.

(56) References Cited

FOREIGN PATENT DOCUMENTS

| EP | 0810451 B1 | 3/2005 |
| FR | 2691230 A1 | 11/1993 |
| FR | 2812727 A1 | 2/2002 |

OTHER PUBLICATIONS

International Search Report dated Jun. 25, 2014 re: Application No. PCT/FR2013/052484; citing: U.S. Pat. No. 5,864,093 A, DE 27 35 344 A1, BE 881 807 A1, FR 2 691 230 A1, US 2010/077954 A1, FR 2 812 727 A1 and EP 0 810 451 B1.

* cited by examiner

TERMINAL FOR DETECTING AN OPTICALLY INVISIBLE NETWORK, INSTALLATION COMPRISING SUCH A DETECTION TERMINAL, AND METHOD FOR DETECTING AN OPTICALLY INVISIBLE NETWORK

TECHNICAL FIELD

The present invention concerns a terminal for detecting an optically invisible network, such as a gas, electricity or water network, an installation comprising such a detection terminal, and a method for detecting an optically invisible network using such a detection terminal.

BACKGROUND

For saving time and costs but also for safety reasons, it is important to be able to detect the presence of an optically invisible network, and to locate it with precision, without digging the ground or destroying structures, upon later works.

Several methods may be used for carrying out the detection of optically invisible networks.

The electromagnetic detection is the most used method. This electromagnetic detection may be performed using electromagnetic detectors based on the active detection of an electromagnetic signal.

There is known an active detection method which comprises injecting, by means a current generator, an electric signal in an electrically conductive wire associated to the network to be identified and disposed along the plot of the latter, and this via connection casings installed at regular distances along the network so as to serve as access points, and of using an electromagnetic detector arranged to sense an electromagnetic field created by an alternating current circulating in the electrically conductive wire.

It is known to dispose each connection casing inside a technical gallery or a manhole.

The drawback of such an arrangement of the connection casings lies in the fact that access to the inside of a technical gallery, a manhole or a wall box is generally prohibited to the unauthorized public. Thus, injecting the electric signal allowing to detect the concerned network most often requires obtaining an authorization of the owner of the network to be detected in order to access the connection casing and/or unlocking a closing device preventing access to said connection casing by means of a suitable unlocking member. For some type of networks to be detected, the presence of an authorized person to access the connection casing may also be essential.

Consequently, the detection of a network may prove to be difficult when the connection casings are disposed inside of technical galleries, manholes or wall boxes.

In order to facilitate access to the connection casings and hence the detection of optically invisible networks, it may be considered to dispose the connection casings in areas accessible to the public. Nonetheless, such an arrangement of the connection casings could generate degradations thereof thereby preventing any later detection of the corresponding network.

BRIEF SUMMARY

The present invention aims to overcome these drawbacks.
Hence, the technical problem underlying the invention comprises providing a detection terminal that is simple in structure and economical, and which allows an easy and quick detection of an optically invisible network, such as a gas, electricity, optical fibers or water (rainwater, waste water, drinking water) network.

To this end, the present invention concerns a detection terminal for detecting an optically invisible network, such as a buried conduit or a buried cable, characterized in that it includes:

a fixing portion intended to be fixed in a structure, a protective portion secured to the fixing portion and arranged to protect the fixing portion, the protective portion being electrically conductive and arranged to be accessible from the outside of the structure when the detection terminal is in use, and connection means intended to connect propagation means arranged to propagate an electric signal, and more particularly an electromagnetic signal, along the optically invisible network, the connection means being connected to the protective portion so as to hold, when in use, an electrical continuity between the protective portion and the propagation means.

The structure of the detection terminal according to the invention allows to inject an electric signal in propagation means associated to an optically invisible network, simply by coupling an electric signal generator, such as a current generator, directly to the protective portion of the detection terminal, and this by using the conductive properties of the protective portion and the electrical continuity between the protective portion and the connection means. Thus, the detection terminal according to the invention does not require intrusion into any closed premises or environment, and hence does not require obtaining any prior authorization of the owner of the network to be detected. This results in easily and quickly locating the optically invisible network associated to the propagation means by using an electromagnetic detector arranged to sense the electromagnetic field created by the alternating current circulating in the propagation means.

In addition, the presence of the protective portion allows protecting the connection means and making them inaccessible to the public, which avoids any risk of damage of these connection means and the associated propagation means. Thus, these arrangements allow ensuring an optimum reliability of the detection of the associated optically invisible network.

Furthermore, the structure of the detection terminal according to the invention allows to create a point for injecting an electric signal which is located in the immediate proximity of the gas or electricity metering boxes and electrical cabinets of the gas and electricity networks, while remaining outside of these devices, which allows to improve the security of the detection of the optically invisible network.

By structure, it is meant in particular a sidewalk, a roadway, a wall, a hatch for access to a technical gallery, a buffer or still a manhole.

Advantageously, the connection means are intended to connect at least one electrically conductive wire belonging to the propagation means.

According to an embodiment of the invention, the at least one electrically conductive wire extends along the optically invisible network and is arranged to propagate, when the detection terminal is in use, an electromagnetic signal along the optically invisible network. Thus, the at least one electrically conductive wire forms an electrically conductive tracer wire. For example, the at least one electrically conductive wire may be disposed outside or inside the optically invisible network.

According to another embodiment of the invention, the connection means are intended to connect at least one electrically conductive wire electrically connected to an electromagnetic clamp which surrounds a portion of the optically invisible network and which is shaped to induce, when the detection terminal is in use, an electric current in an electrically conductive element extending at least partially along the optically invisible network. Advantageously, the electrically conductive element forms at least partially the optically invisible network. Such an electromagnetic clamp is used more particularly when the optically invisible network is an electricity network.

According to an embodiment of the invention, the protective portion is intended to flush with or protrude from the outer surface of the structure.

Advantageously, the protective portion includes a substantially planar detection surface.

According to an embodiment of the invention, the protective portion comprises a protective wall including a central portion and a peripheral portion surrounding the central portion.

Advantageously, the protective wall covers at least partially the fixing portion, and preferably at least the central portion of the fixing portion.

According to an embodiment of the invention, the protective portion is arranged to protect in a sealed manner the fixing portion.

Preferably, the fixing portion is electrically conductive, and is electrically connected to the protective portion.

According to an embodiment of the invention, the detection terminal includes an electrically conductive body comprising the fixing portion and the protective portion.

The electrically conductive body is preferably metallic, and for example made of a cast iron.

According to an embodiment of the invention, the protective portion and the fixing portion are integral. Advantageously, the electrically conductive body is integral.

It should be noted that the propagation means, and more particularly the at least one electrically conductive wire, are advantageously grounded via the body of the detection terminal.

Preferably, the protective wall forms an end wall of the electrically conductive body.

Preferably, the protective portion comprises coupling means intended to the coupling of an electric signal source, such as an electric signal generator. Preferably, the coupling means are disposed in a central area of the protective portion. According to an embodiment of the invention, the coupling means for the injection of the electric signal are arranged on the protective wall, and for example, on the central portion of the protective wall.

According to a variant of the invention, the electric signal generator could be coupled to the protective portion by magnetization.

According to an embodiment of the invention, the protective portion includes a protective plate secured to the fixing portion and forming the protective wall.

According to an embodiment of the invention, the fixing portion comprises a connecting portion connected to the central portion of the protective wall.

According to an embodiment of the invention, the fixing portion is arranged to be fixed in a roadway, a sidewalk or still on a wall facade, proximate to the network to be detected.

According to an embodiment of the invention, the connection means are mounted on the fixing portion so as to hold, when in use, an electrical continuity between the protective portion and the propagation means.

Preferably, the connection means are electrically conductive.

Preferably, the fixing portion delimits at least one housing in which the connection means are housed. According to an embodiment of the invention, the fixing portion delimits two housings, for example diametrically opposite to each other. The or each housing opens for example outwardly of the fixing portion, and preferably substantially radially outwardly of the fixing portion.

According to an embodiment of the invention, the fixing portion includes a base opposite to the protective portion. Preferably, the base delimits at least partially the or each housing. For example, the base forms partially the lower wall of each housing.

According to an embodiment of the invention, the base extends substantially parallel to the protective wall.

According to an embodiment of the invention, the protective portion is devoid of through opening.

Each housing is delimited for example by an upper wall extending substantially parallel to the base, two side walls extending substantially perpendicular to the upper wall, and a lower wall formed by the base.

Advantageously, the fixing portion includes at least one passage opening which opens into the at least one housing and intended for the passage of at least one electrically conductive wire belonging to the propagation means. According to an embodiment of the invention, the at least one passage opening is arranged on the base.

Advantageously, the connection means include at least one electrically conductive connection element on which is intended to be connected at least one electrically conductive wire belonging to the propagation means, and preferably two to three electrically conductive wires.

The connection element comprises for example clamping means arranged to clamp, when in use, the core of the at least one electrically conductive wire. The clamping means include for example at least one pair of clamping members disposed facing each other and arranged to clamp the core of an electrically conductive wire. The clamping means are advantageously movable between a position of clamping the corresponding electrically conductive wire and a position of releasing the electrically conductive wire. Each clamping member is advantageously formed by an elastically deformable clamping tab. These arrangements allow to quickly fix an electrically conductive wire belonging to the propagation means, and this without requiring the use of any tool.

The connection element may be made of the same material as the core of an electrically conductive wire, and preferably of stainless steel, for example the 304L type stainless steel. The connection element is preferably integral, and is realized, for example, by deep-drawing and bending.

According to an embodiment of the invention, the connection element includes a substantially planar support portion, and a yoke-shaped portion extending above the support portion and the ends of which are secured to the support portion.

According to an embodiment of the invention, the connection means include two electrically conductive connection members. According to this embodiment, each connection element is preferably mounted in a different housing delimited by the fixing portion.

Preferably, the detection terminal comprises at least one protective casing made of an electrically non-conductive material in which the connection means are mounted. The protective casing is preferably housed in the housing or in one of the housings delimited by the fixing portion. The protective casing is for example shaped to seal at least partially the corresponding housing.

According to an embodiment of the invention, the protective casing comprises immobilization means arranged to immobilize the connection means. The immobilization means include for example at least one immobilizing member arranged to press the connection means against the protective casing.

According to an embodiment of the invention, the protective casing bears against the upper face of the base.

The protective casing is for example made of a plastic material, and for example of a polypropylene-based copolymer.

According to an embodiment of the invention, the protective casing may be translucent to allow an operator to check the coupling of an electrically conductive wire on the connection means.

Preferably, the protective casing includes at least one passage opening intended for the passage of at least one electrically conductive wire belonging to the propagation means.

According to an embodiment of the invention, the protective casing includes a mounting body on which the connection means are mounted, and a protective cowl mounted, for example in a non-detachable manner, on the mounting body.

Advantageously, the protective casing includes guide means arranged to guide the core of the at least one electrically conductive wire when connecting the at least one electrically conductive wire on the connection means. The guide means include for example a guide portion arranged on the mounting body and delimiting at least one guide passageway intended to receive the core of an electrically conductive wire.

Advantageously, at least one guide passageway includes a flared introduction portion so as to facilitate the introduction therein of the core of the corresponding electrically conductive wire.

According to an embodiment of the invention, the protective casing includes abutment means arranged to limit the displacement path of the clamping members. The abutment means are advantageously arranged on the mounting body.

Preferably, the immobilization and/or guide means are arranged on the mounting body.

According to an embodiment of the invention, the protective casing includes holding means arranged to hold, when in use, the at least one electrically conductive wire in the guide means.

Preferably, the holding means are arranged on the protective cowl. According to an embodiment of the invention, the holding means include at least one holding member arranged on the protective cowl and disposed substantially in front of a guide passageway.

Advantageously, at least one holding member is arranged to extend through a passage aperture arranged on the connection element.

According to an embodiment of the invention, the guide means are disposed substantially facing at least one passage orifice provided on the protective casing and intended for the passage of the core of the at least one electrically conductive wire.

According to an embodiment of the invention, the detection terminal comprises fixing means arranged to fix the connection means on the fixing portion. Preferably, the fixing means are also arranged to fix the protective casing housing the connection means on the fixing portion. Preferably, the fixing means are electrically conductive so as to ensure electrical continuity between the connection means and the fixing portion. The fixing means include for example at least one electrically conductive fixing member such as a fixing screw.

According to another embodiment of the invention, the fixing means are arranged to fix by magnetization the connection means on the fixing portion.

According to an embodiment of the invention, the detection terminal may be a line-end terminal.

According to an embodiment of the invention, the fixing portions and the protective portions could be formed by the frame of an access hatch, a manhole or a buffer, or attached on said frame.

The present invention concerns an installation comprising a detection terminal according to the invention and propagation means connected to the connection means belonging to the detection terminal and shaped to propagate, when the detection terminal is in use, an electric signal along the optically invisible network.

The detection terminal is advantageously fixed in a structure so that the protective portion is accessible from the outside of the structure.

Preferably, the propagation means include at least one electrically conductive wire connected to the connection means belonging to the detection terminal.

According to an embodiment of the invention, the at least one electrically conductive wire extends at least partially along the optically invisible network.

According to another embodiment of the invention, the propagation means further include, on the one hand, an electromagnetic clamp which is electrically connected to the at least one electrically conductive wire and which surrounds a portion of the optically invisible network, and on the other hand, an electrically conductive element extending, at least partially, along the optically invisible network, the electromagnetic clamp being shaped to induce, when the detection terminal is in use, an electric current in the electrically conductive element. According to an embodiment, the electrically conductive element forms at least partially the optically invisible network, or extends outside of the latter.

The invention further concerns a method for detecting an optically invisible network, comprising the steps comprising:
  providing a detection terminal according to the invention,
  providing propagation means arranged to propagate an electric signal, and more particularly an electromagnetic signal, along the optically invisible network,
  electrically connecting the propagation means to the connection means of the detection terminal,
  fixing the fixing portion of the detection terminal in a structure so that the protective portion is accessible from the outside of the structure,
  injecting an electric signal in the protective portion of the detection terminal, and
  detecting the electromagnetic field generated by the propagation means.

The step of injecting an electric signal is preferably carried out using an electric signal generator, such as a current generator. The detection step is advantageously carried out using an electromagnetic detector.

Advantageously, the fixing step comprises fixing the fixing portion in the proximity of the optically invisible network to be detected. Preferably, the fixing step comprises fixing the fixing portion in the proximity of a gas metering box when the optically invisible network is a gas conduit and in the proximity of an electrical cabinet or an electrical transformer when the optically invisible network is an electrical cable.

Preferably, the fixing step comprises fixing the fixing portion in a sidewalk, a roadway or still in a wall.

BRIEF DESCRIPTION OF THE DRAWINGS

Anyway, the invention will be better understood upon reading the description that follows with reference to the appended schematic drawing representing, as non-limiting examples, several embodiments of this detection terminal.

FIGS. 1 to 10 represent a terminal 2 for detecting an optically invisible network, such as a gas, electricity, optical fibers or water network.

DETAILED DESCRIPTION

Figure 1:
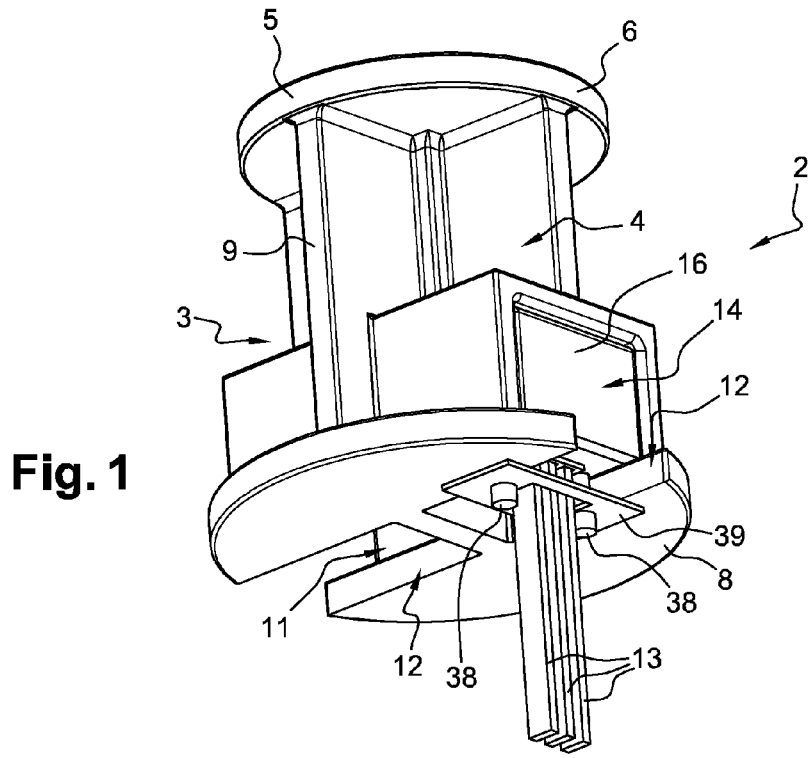
FIG. 1 is a bottom perspective view of a detection terminal according to a first embodiment of the invention.

The detection terminal 2 comprises an electrically conductive body 3, preferably metallic, and for example made of cast iron. The body 3 is integral and comprises a fixing portion 4 intended to be fixed in a structure, and more particularly in a roadway or a sidewalk, and a protective portion 5 secured to the fixing portion 4 and intended to be accessible to an operator from the outside of the structure. The protective portion 5 is more particularly intended to flush with or protrude from the outer surface of the structure.

The protective portion 5 is formed by a protective plate 6 secured to the fixing portion 4. The body 3 is advantageously arranged so that the protective plate extends substantially parallel to the outer surface of the structure.

According to the embodiment represented in FIGS. 1 to 10, the protective plate 6 presents a circular shape. However, the protective plate 6 may present any other shape, for example a square or rectangular shape. The protective plate 6 presents a detection surface 7 opposite to the fixing portion 4. The detection surface 7 may advantageously include means for identifying the network to be detected. These identification means may include for example inscriptions engraved or printed directly on the detection surface 7, or attached thereon, for example by bonding or fixing an identification element provided with these inscriptions.

According to the embodiment represented in FIGS. 1 to 10, the fixing portion 4 includes a base 8 and a connecting portion 9 connecting the base 8 to the protective plate 6. The fixing portion 4 includes two housings 11 opposite to each other and each delimited by the connecting portion 9 and the base 8. Each housing 11 opens outwardly of the body 3, and presents preferably a parallelepiped shape.

Figure 2:
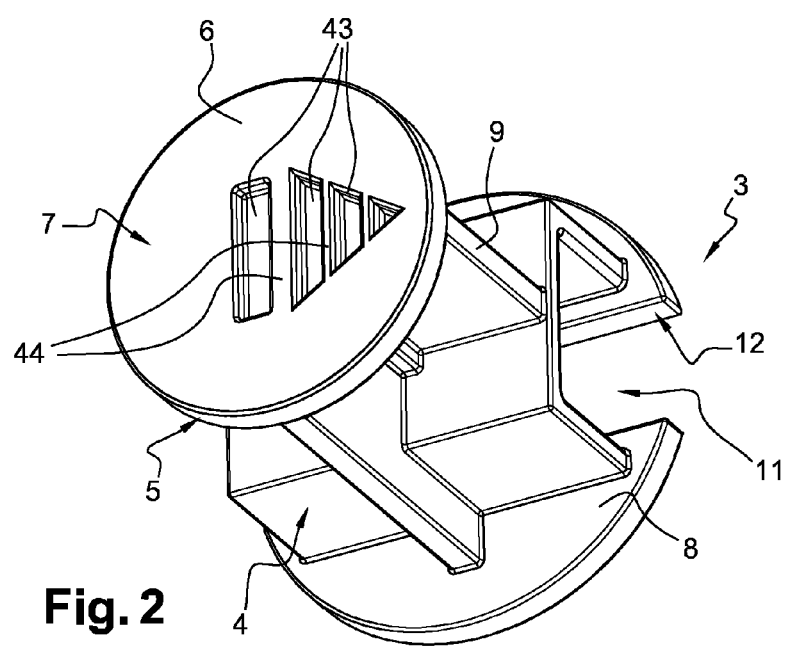
FIG. 2 is a top perspective view of an electrically conductive body of the detection terminal of FIG. 1.

As shown in FIGS. 1 and 2, the base 8 extends substantially parallel to the protective plate 6, and comprises two passage openings 12 each opening into one of the housings 11. Each passage opening 12 is adapted for the passage of several electrically conductive wires 13.

Figure 4:
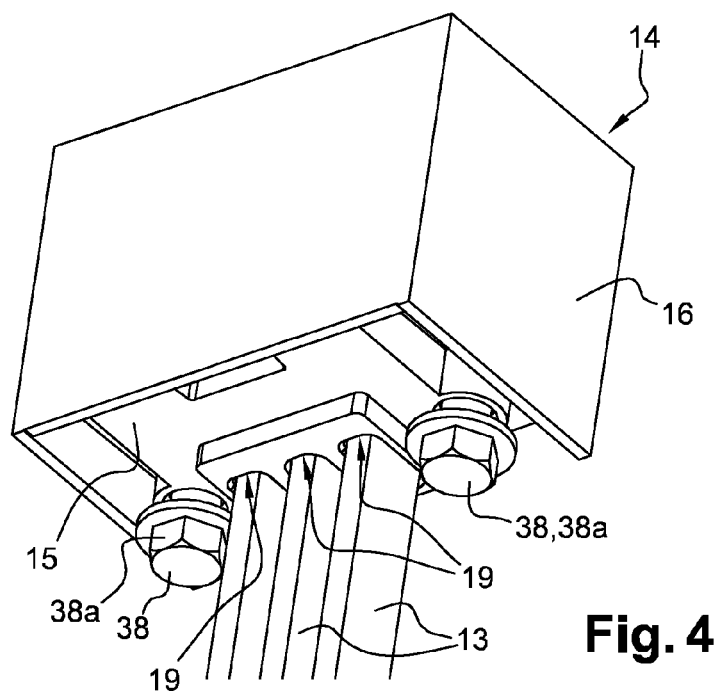
FIG. 4 is a perspective view of a protective casing of the detection terminal of FIG. 1.

As shown in FIGS. 1 and 4, the detection terminal 2 comprises a protective casing 14 housed in one of the housings 11 of the fixing portion 4. The protective casing 14 is advantageously made of an electrically non-conductive material, for example plastic material. The protective casing 14 may for example be translucent.

The protective casing 14 is composed of a mounting body 15, and of a protective cowl 16 mounted on the mounting body 15. As shown in FIG. 1, the protective cowl 16 bears against the upper face of the base 8 and is shaped to partially seal the corresponding housing 11.

Figure 7:
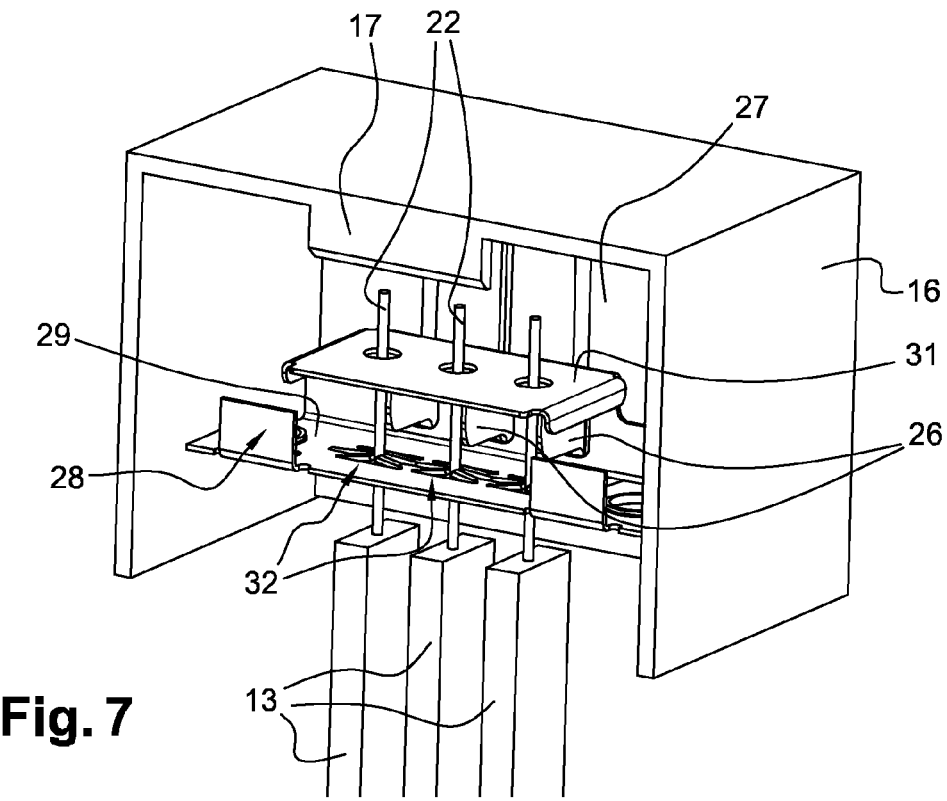
FIG. 7 is a perspective view showing the cooperation between the connection element shown in FIG. 6 and a protective cowl belonging to the protective casing of FIG. 4.
Figure 8:
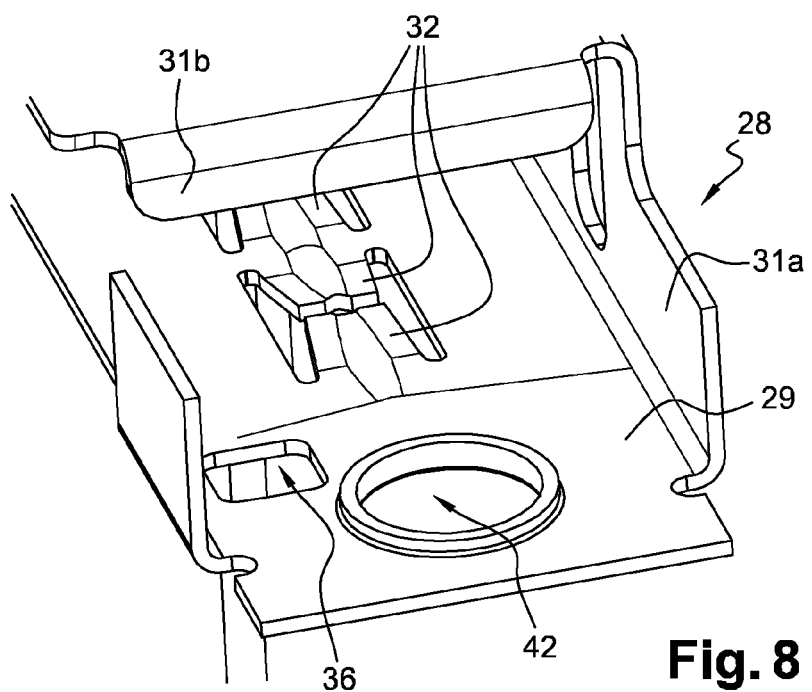
FIG. 8 is a partial perspective view, at the enlarged scale, of the connection element shown in FIG. 6.

As shown in FIG. 7, the protective cowl 16 comprises a snap-fit tab 17 arranged to cooperate with the mounting body 15 so as to fix the protective cowl 16 on the latter.

Figure 5:
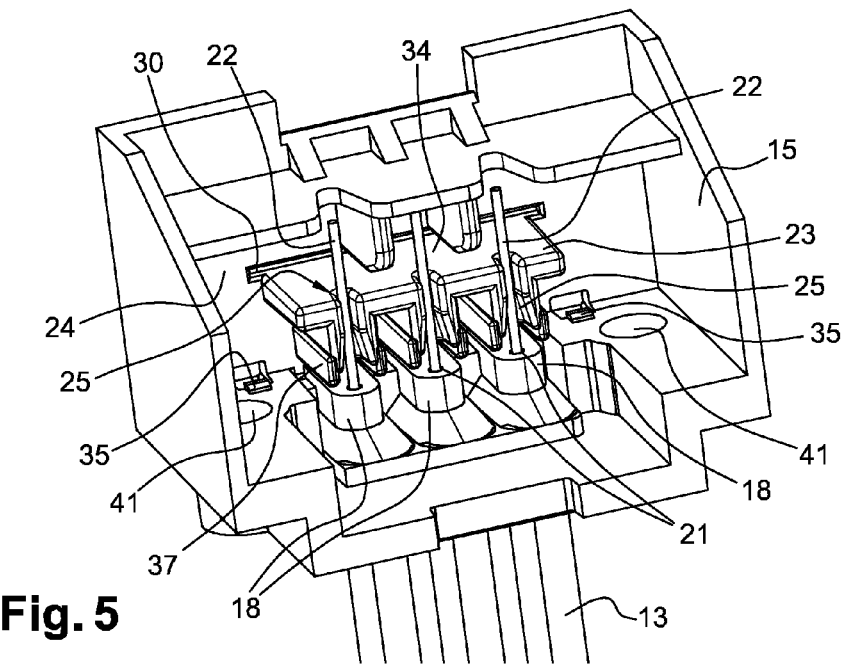
FIG. 5 is a perspective view of a mounting body belonging to the protective casing of FIG. 4.

As shown in FIGS. 4 and 5, the mounting body 15 includes three mounting portions 18 each delimiting a housing 19 intended to receive the end portion of the sheath of an electrically conductive wire 13, and three passage orifices 21 each opening into one of the housings 19 and each adapted for the passage of the core 22 of the corresponding electrically conductive wire 13. Each housing 19 presents advantageously a shape complementary of the sheath of the corresponding electrically conductive wire 13. For example, the sheath of each electrically conductive wire 13 and each housing 19 may present a rectangular section.

The mounting body 15 further comprises a guide portion 23 extending from the bottom wall 24 of the mounting body 15 and delimiting three guide passageways 25 each opening facing one of the passage orifices 21. Each guide passageway 25 is intended to guide the core 22 of the corresponding electrically conductive wire 13 when inserting the latter in the corresponding mounting portion 18. Advantageously, each guide passageway 25 includes a flared introduction portion so as to facilitate the introduction therein of the core 22 of the corresponding electrically conductive wire 13.

As shown in FIG. 7, the protective cowl 16 includes three holding members 26 extending from the front wall 27 of the protective cowl 16, and arranged to be disposed each facing one of the guide passageways 25 when the protective cowl is mounted on the mounting body 15. Each holding member 26 is arranged to hold, when in use, the core 22 of the associated electrically conductive wire 13 in the corresponding guide passageway 25.

Figure 6:
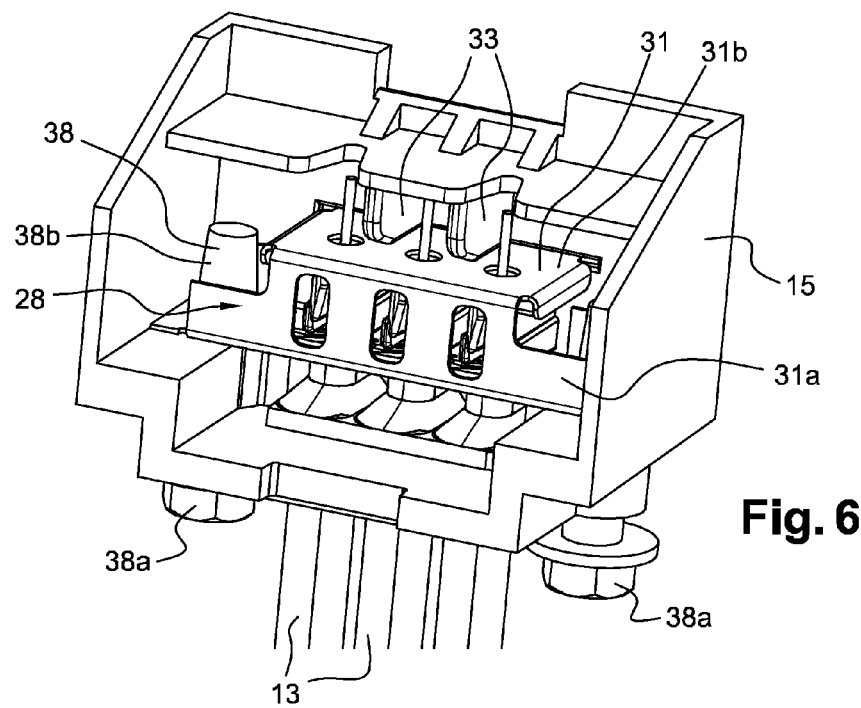
FIG. 6 is a perspective view of the mounting body of FIG. 5 on which there is mounted a connection element belonging to the detection terminal of FIG. 1.

As more particularly shown in FIGS. 6 and 7, the detection terminal 2 further includes an electrically conductive connection element 28 mounted in the protective casing 14. According to the embodiment represented in FIGS. 1 to 10, the connection element 28 is shaped to connect three electrically conductive wires 13.

The connection element 28 is advantageously integral, and is for example realized by deep-drawing and bending. The connection element 28 is preferably made of the same material as the core 22 of each electrically conductive wire 13, and for example of stainless steel, such as the 304L type stainless steel.

The connection element 28 includes a substantially planar and rectangular-shaped support portion 29, and a folded portion 31 extending above the support portion 29 and the free end of which is engaged in a slot 30 arranged in the bottom wall 24 of the mounting body 15. The folded portion 31 preferably comprises a first portion 31a extending substantially perpendicular from the support portion 29, and a second portion 31b extending from the first portion 31a and substantially parallel to the support portion 29.

The connection element 28 comprises three pairs of clamping tabs 32 substantially aligned and extending from the support portion 29. As more particularly shown in FIG. 8, the clamping tabs 32 of each pair are disposed facing each other and arranged to clamp, when in use, the core 22 of an electrically conductive wire 13. Each clamping tab 32 is elastically deformable between a standby position and a position of clamping the corresponding electrically conductive wire 13.

The mounting body 15 comprises immobilization means arranged to immobilize the connection element 28. The immobilization means include advantageously two immobilizing ribs 33 (shown in FIG. 6) arranged to cooperate with the second portion 31b of the folded portion 31 so as to press the latter on a substantially planar bearing surface 34 provided on the guide portion 23, and two immobilizing members 35 (shown in FIG. 5) arranged to cooperate each by snap-fitting with an aperture 36 (shown in FIG. 8) arranged on the support portion 29 of the connection element 28.

Figure 9:
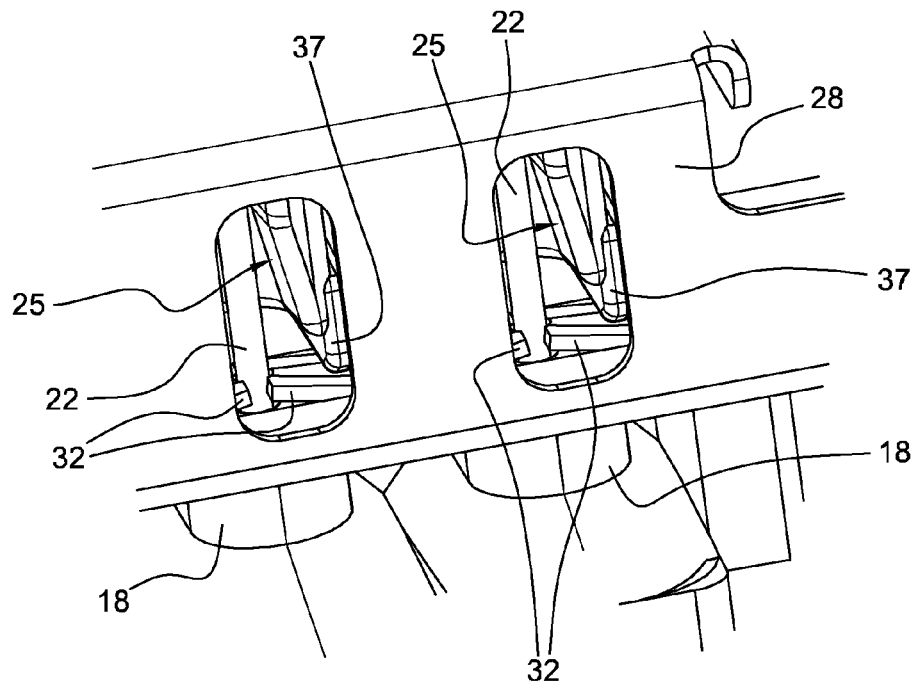
FIG. 9 is a partial perspective view, at the enlarged scale, of a detail of FIG. 6.

As more particularly shown in FIGS. 5 and 9, the mounting body 15 also includes abutment members 37 disposed each proximate to one of the clamping tabs 32. Each abutment member 37 is arranged to limit the displacement path of the corresponding clamping tab 32. These arrangements allow to avoid an unintended disconnection of the electrically conductive wires 13.

The detection terminal 2 further comprises two fixing screws 38 arranged to fix the connection element 28 on the fixing portion 4 of the body 3, and more particularly on the base 8 of the body 3. The fixing screws 38 are metallic so as to ensure an electrical continuity between the connection element 28 and the body 3. Thus, when in use, the connection element 28 ensures an electrical continuity between the body 3 and each electrically conductive wire 13.

Each fixing screw 38 comprises a head 38a bearing against the lower face of a fixing plate 39 positioned against the lower face of the base 8, and a screw body 38b extending successively through a passage orifice arranged in the fixing plate 39, one of the passage openings 12 arranged in the base 8, a passage opening 41 arranged in the mounting body 15, and a passage orifice 42 arranged on the support portion 29 of the connection element 28.

According to the embodiment represented in FIGS. 1 to 10, the protective plate 6 comprises, on its detection surface 7, a plurality of footprints or cavities 43 delimiting coupling ribs 44 allowing for example the hanging of an electrical coupling clamp connected to a current generator. These arrangements allow to facilitate the coupling of the current generator on the body 3 of the detection terminal 2.

Figure 3:
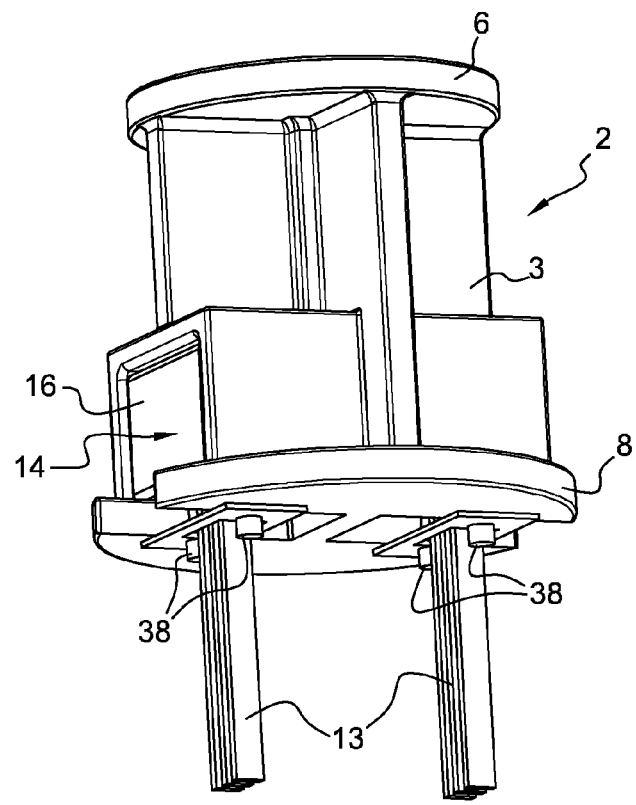
FIG. 3 is a side perspective view of the detection terminal of FIG. 1 equipped with two protective casings.

According to an implementation variant of the invention shown in FIG. 3, the detection terminal 2 could include two protective casings 14 each mounted in one of the housings 11 and each housing a connection element 28, each connection element 28 being then fixed on the base 8 using two fixing screws 38 and being adapted for coupling three electrically conductive wires 13.

Figure 10:
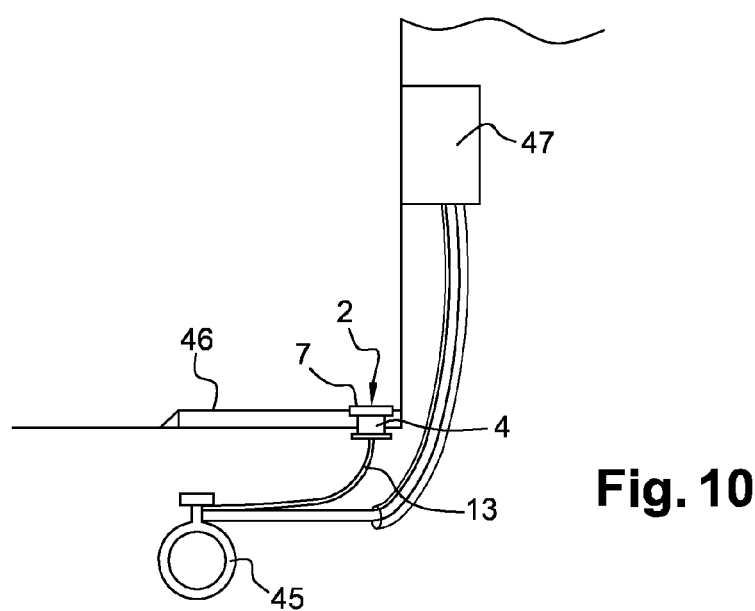
FIG. 10 is a schematic view of a first installation comprising a detection terminal, according to FIG. 1, fixed to the ground.

A method for detecting an optically invisible network 45, such as a gas, electricity, optical fibers or water network, using a detection terminal 2 according to the invention will now be described in particular with reference to FIG. 10.

This method comprising:
providing a detection terminal 2 according to the invention,
providing at least one electrically conductive wire 13 extending along the optically invisible network 45,
stripping one of the ends of the electrically conductive wire 13,
connecting the stripped end of the electrically conductive wire 13 on the connection element 28 of the detection terminal 2,
fixing the fixing portion 4 of the body 3 of the detection terminal 2 in a structure, such as a sidewalk 46 proximate to the network to be detected 45,
coupling a current generator on the detection surface 7 of the detection terminal 2,
injecting an electric signal in the body 3 of the detection terminal 2 using the current generator, and
detecting the electromagnetic field generated by the electrically conductive wire 13 using an electromagnetic detector so as to detect and follow the network 45.

The fixing step advantageously comprises fixing the fixing portion 4 of the body 3 of the detection terminal 2 in the proximity of a gas metering box 47 when the network to be detected is a gas network, and in the proximity of an electricity metering box, an electrical cabinet or an electrical transformer when the network to be detected is an electrical network.

Figure 11:
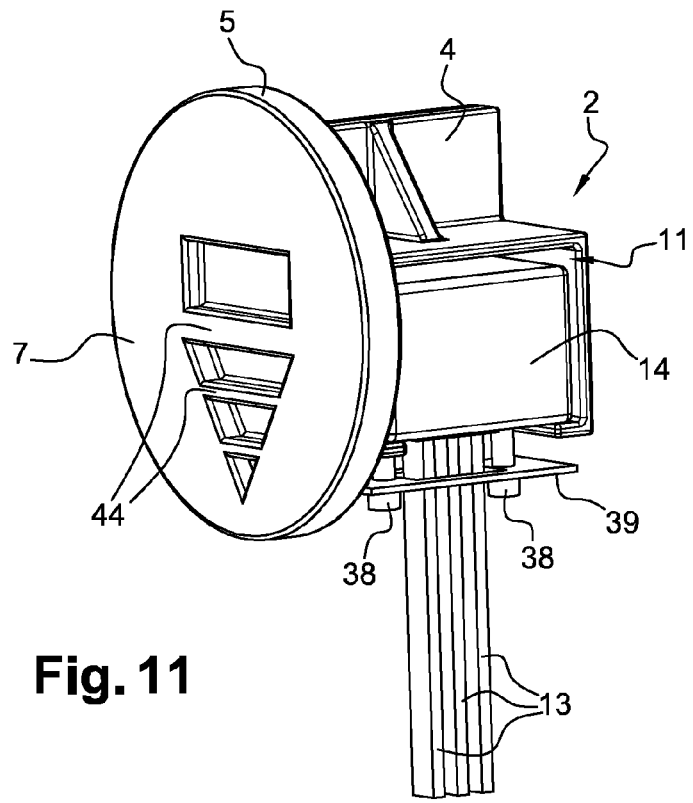
FIGS. 11 and 12 are perspective views of two detection terminals according to second and third embodiments of the invention.
Figure 13:
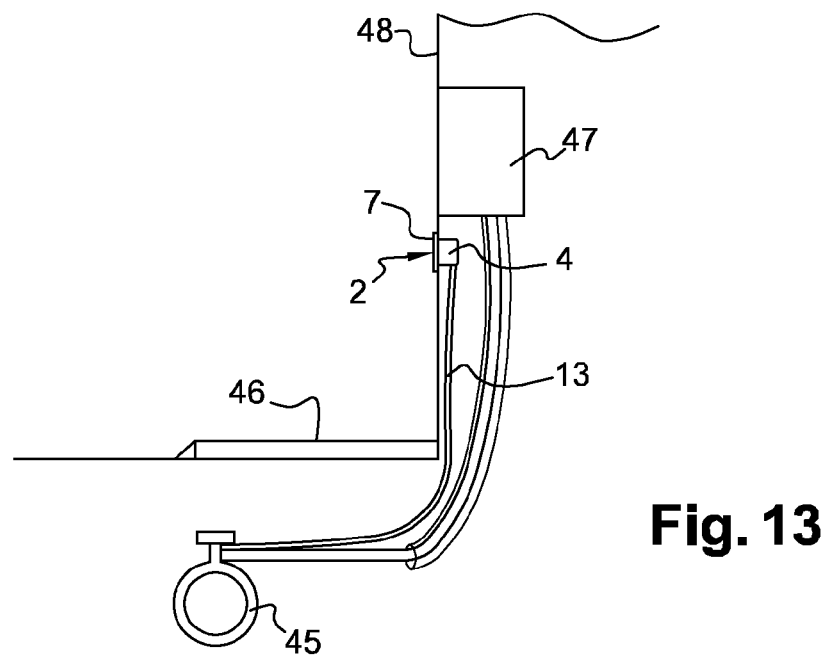
FIG. 13 is a schematic view of a second installation comprising a detection terminal, according to FIG. 11, fixed to a wall.

FIG. 11 represents a detection terminal 2 according to a second embodiment of the invention which differs from the one represented in FIGS. 1 to 10 essentially in that the fixing portion 4 is devoid of any base and includes one single housing 11. The detection terminal 2 represented in FIG. 11 is more particularly intended to be fixed on a wall 48, as is schematized in FIG. 13, and thereby forms a wall detection terminal.

Figure 12:
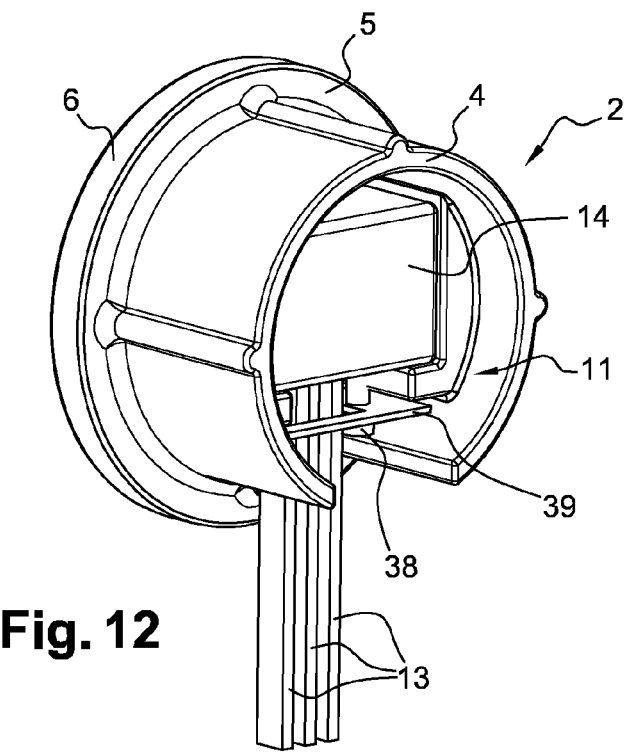

FIG. 12 represents a detection terminal 2 according to a third embodiment of the invention which differs from the one represented in FIG. 11 essentially in that the housing 11 opens opposite to the protective plate 6.

Figure 14:
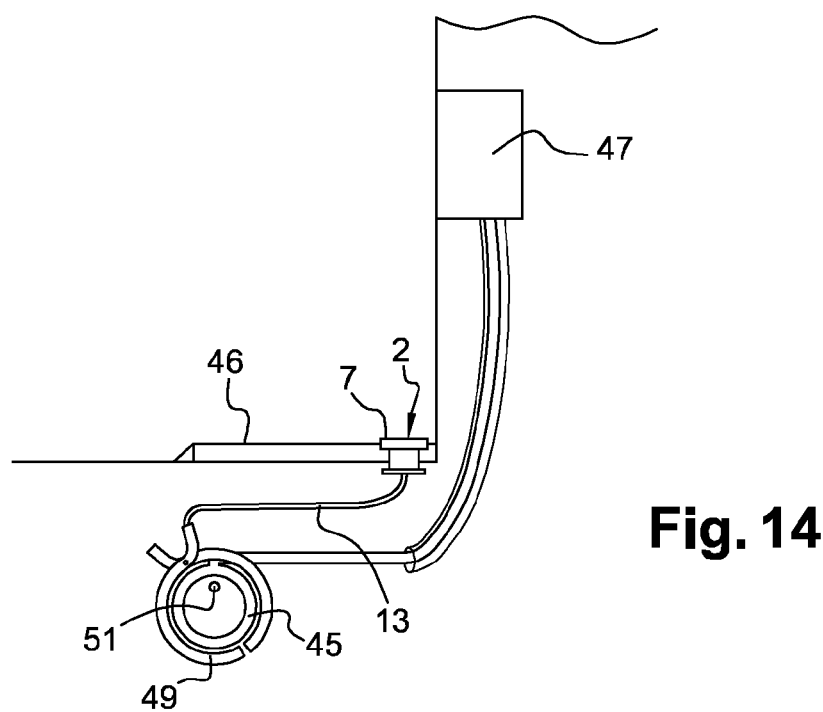
FIG. 14 is a schematic view of a third installation comprising a detection terminal, according to FIG. 1, fixed to the ground.

According to an implementation variant of the detection method according to the invention schematized more particularly in FIG. 14, the electrically conductive wire 13 may be electrically connected to an electromagnetic clamp 49 which is disposed around a portion of the optically invisible network 45 and which is shaped to induce, when the detection terminal 2 is in use, that is to say when a current generator is coupled to the protective portion 5 of the latter, an electric current in an electrically conductive element 51 extending at least partially along the optically invisible network 46. Advantageously, the electrically conductive element 51 forms at least partially the optically invisible network 46 when the latter is an electrical network.

It goes without saying that the invention is not limited to the sole embodiments of this detection terminal, described above as examples, on the contrary, it encompasses all variants.

The invention claimed is:

1. A detection terminal for detecting an optically invisible network comprising:
   a fixing portion intended to be fixed in a structure, the fixing portion including a housing,
   a protective portion secured to the fixing portion and arranged to protect the fixing portion, the protective portion being electrically conductive and arranged to be accessible from the outside of the structure when the detection terminal is in use,
   connection means intended to connect propagation means arranged to propagate an electric signal along the optically invisible network, the connection means being housed in the housing of the fixing portion and being connected to the protective portion so as to hold, when in use, an electrical continuity between the protective portion and the propagation means, and
   a protective casing made of an electrically non-conductive material, the protective casing being housed in the housing of the fixing portion and the connection means being mounted in the protective casing,
   wherein the protective portion covers at least partially the fixing portion and the connection means and is configured to make the connection means inaccessible.

2. The detection terminal according to claim 1, wherein the protective portion comprises a protective wall including a central portion and a peripheral portion surrounding the central portion.

3. The detection terminal according to claim 1, wherein the fixing portion is electrically conductive, and is electrically connected to the protective portion.

4. The detection terminal according to claim 1, wherein the fixing portion includes at least one passage opening which opens into the at least one housing and intended for the passage of at least one electrically conductive wire belonging to the propagation means.

5. The detection terminal according to claim 1, wherein the fixing portion includes a base opposite to the protective portion.

6. The detection terminal according to claim 1, wherein the connection means include at least one electrically conductive connection element on which is intended to be connected at least one electrically conductive wire belonging to the propagation means.

7. The detection terminal according to claim 6, wherein the connection element comprises clamping means arranged to clamp, when in use, the core of the at least one electrically conductive wire.

8. The detection terminal according to claim 1, further comprising fixing means arranged to fix the connection means on the fixing portion.

9. The detection terminal according to claim 8, wherein the fixing means are electrically conductive so as to ensure an electrical continuity between the connection means and the fixing portion.

10. An installation comprising a detection terminal according to claim 1 and propagation means connected to the connection means belonging to the detection terminal and configured to propagate, when the detection terminal is in use, an electric signal along the optically invisible network.

11. A method for detecting an optically invisible network, the method including the following steps:
    providing a detection terminal, wherein the detection terminal includes
    a fixing portion delimiting a housing,
    a protective portion secured to the fixing portion and arranged to protect the fixing portion, the protective portion being electrically conductive,
    connection means housed in the housing delimited by the fixing portion and being connected to the protective portion, the protective portion covering at least partially the fixing portion and the connection means and being configured to make the connection means inaccessible,
    and a protective casing made of an electrically non-conductive material, the protective casing being housed in the housing delimited by the fixing portion and the connection means being mounted in the protective casing,
    providing propagation means arranged to propagate an electric signal along the optically invisible network,
    electrically connecting the propagation means to the connection means of the detection terminal,
    fixing the fixing portion of the detection terminal in a structure so that the protective portion is accessible from the outside of the structure,
    injecting an electric signal in the protective portion of the detection terminal, and
    detecting the electromagnetic field generated by the propagation means.

12. The detection terminal according to claim 1, wherein the protective portion is intended to flush with or protrude from the outer surface of the structure.

13. The detection terminal according to claim 1, wherein the protective portion and the fixing portion are made in one piece.

14. The detection terminal according to claim 1, wherein the detection terminal includes an electrically conductive body comprising the fixing portion and the protective portion, the protective portion forming an end wall of the electrically conductive body.

* * * * *